US012155129B2

(12) United States Patent
Ramabadran et al.

(10) Patent No.: US 12,155,129 B2
(45) Date of Patent: Nov. 26, 2024

(54) WIDEBAND OUTPHASING ON-ANTENNA SPATIAL COMBINATION WITH REDUCED LOAD MODULATION

(71) Applicant: QUALCOMM Incorporated, San Diego, CA (US)

(72) Inventors: Prasidh Ramabadran, Bangalore (IN); Pavel Afanasyev, Espoo (FI); Madhav Venkateswaran, Hyderabad (IN); Sanjaya Kumar Khatua, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/951,857

(22) Filed: Sep. 23, 2022

(65) Prior Publication Data

US 2024/0106120 A1 Mar. 28, 2024

(51) Int. Cl.
*H01Q 5/378* (2015.01)
*H01Q 5/48* (2015.01)
*H01Q 21/26* (2006.01)

(52) U.S. Cl.
CPC ............... *H01Q 5/378* (2015.01); *H01Q 5/48* (2015.01); *H01Q 21/26* (2013.01)

(58) Field of Classification Search
CPC ........... H01Q 5/378; H01Q 5/48; H01Q 21/26
See application file for complete search history.

(56) References Cited

U.S. PATENT DOCUMENTS 11,296,415 B2 * 4/2022 Fabrega Sanchez .. H01Q 5/378
2021/0098894 A1 * 4/2021 Haviv .................. H01Q 21/062

FOREIGN PATENT DOCUMENTS

EP 4002588 A1 * 5/2022 ........... H01Q 21/065

* cited by examiner

*Primary Examiner* — Seung H Lee
(74) *Attorney, Agent, or Firm* — Haynes and Boone, LLP/Qualcomm Incorporated

(57) ABSTRACT

An outphasing antenna structure is provided that includes a first antenna feeder and a second antenna feeder. A high-PAPR signal is decomposed into a first constant-envelope signal that drives the first antenna feeder and into a second constant-envelope signal that drives the second antenna feeder. The pair of antenna feeders parasitically couple to an antenna that radiates the first and second constant-envelope signals that spatially combine in free space into the high-PAPR signal.

18 Claims, 8 Drawing Sheets

WIDEBAND OUTPHASING ON-ANTENNA SPATIAL COMBINATION WITH REDUCED LOAD MODULATION

FIELD OF TECHNOLOGY

The present disclosure relates generally to wireless communications and more specifically to a wideband outphasing on-antenna spatial combination with reduced load modulation.

BACKGROUND

Relatively complex modulation schemes such as orthogonal frequency division multiplexing (OFDM) enable modern wireless communication systems such as fifth generation (5G) systems to achieve ever higher data rates. But such modulation schemes present a number of challenges. For example, maintaining the orthogonality between the subcarriers in OFDM requires linear amplification in the transmitter. But linear amplification in typical power amplifiers is often power inefficient as compared to amplification such as in the saturation region. This choice between linearity and power efficiency is exacerbated by the relatively-large peak-to-average power ratio (PAPR) for OFDM signals. Such a large PAPR may require the biasing of the power amplifier at a power level significantly below the saturation region to maintain linearity, which then results in power inefficiency. Should the power amplifier then be biased for a more power efficient operation, complex non-linear distortion techniques are required to address the resulting non-linearity.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an outphasing antenna structure is provided that includes: a substrate including a first metal layer, a second metal layer, and a third metal layer; a ground plane formed in the first metal layer; a first linear antenna feeder formed in the second metal layer, the first linear antenna feeder having a length so as to be resonant at a first frequency within a first frequency band, the first linear antenna feeder being coupled to a first via that extends through the ground plane to a first transmission line configured to drive the first via and the first linear antenna feeder with a first outphasing signal; a second linear antenna feeder formed in the second metal layer, the second linear antenna feeder having a length so as to be resonant at the first frequency within the first frequency band, the second linear antenna feeder being coupled to a second via that extends through the ground plane to a second transmission line configured to drive the second via and the second linear antenna feeder with a second outphasing signal; and a first patch antenna formed in the third metal layer, the first patch antenna having a width so as to be resonant at a second frequency within the first frequency band.

In accordance with another aspect of the disclosure, an outphasing method is provided that includes: driving a first antenna feeder with a first constant-envelope signal to parasitically couple the first constant-envelope signal to a first antenna while driving a second antenna feeder with a second constant-envelope signal to parasitically couple the second constant-envelope signal to the first antenna; and radiating the first constant-envelope signal and the second constant-envelope signal from the first antenna to form in free space a spatially-combined signal having a varying envelope.

In accordance with yet another aspect of the disclosure, an outphasing antenna structure is provided that includes: a plurality of four J-shaped antenna feeders; a first patch antenna configured to parasitically couple to the plurality of four J-shaped antenna feeders over a first frequency band; and a second patch antenna configured to parasitically couple to the plurality of four J-shaped antenna feeders over a second frequency band that is a higher frequency band than the first frequency band.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1A:
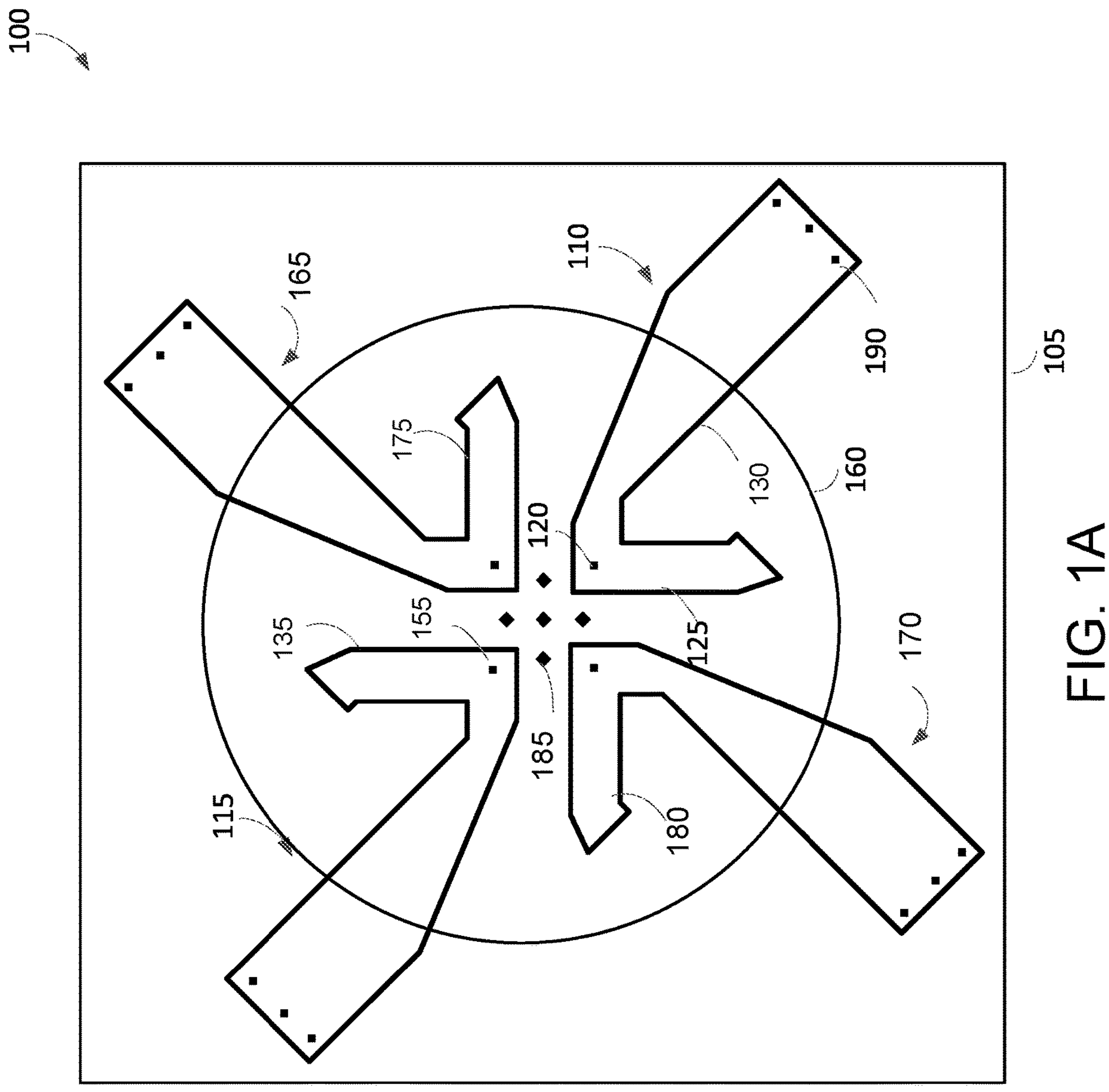
FIG. 1A is a plan view of a dual-polarized wideband antenna structure for outphasing in accordance with an aspect of the disclosure.

The relatively large PAPR of modulation techniques such as OFDM leads to tradeoffs between linearity and power efficiency in the power amplifier. Outphasing addresses this tradeoff by decomposing the large-PAPR signal into two constant-envelope signals. The two constant-envelope signals may then be amplified in corresponding power amplifiers that are operating in saturation or relatively close to saturation. In this fashion, the dilemma of choosing between linearity and power efficiency is solved. Although outphasing is advantageous, the large-PAPR signal must then be recovered from the constant-envelope signals. For example, each constant-envelope signal may be separately amplified and transmitted over a dedicated antenna (or antennas). The combination thus occurs in free-space (a spatial combining) as the amplified constant-envelope signals propagate towards a remote receiver. But such free-space combination may be problematic in that the constant-envelope signals may occupy a substantially larger bandwidth than the corresponding large-PAPR signal. The propagation of the amplified constant-envelope signals over the air may then violate spectral requirements.

As an alternative to such free-space combination, the transmitter may include a power combiner in which the amplified constant-envelope signals are combined prior to be transmitted over the air. This combination may occur as an addition of the amplified constant-envelope signals in a power combiner to provide an amplified large-PAPR signal that may then be transmitted over an antenna. Alternatively, the two amplified constant-envelope signals may be both fed to an antenna to be combined on the antenna. But regardless of whether the combination is positive or differential, the combination produces load modulation on the corresponding power amplifiers. The resulting load modulation reduces power efficiency and may also affect the signal envelope and thus degrade the data transmission.

To address the load modulation, the power amplifiers may be Chireix compensated. In such compensation, one power amplifier is capacitively loaded whereas the other power amplifier is inductively loaded. But this loading addresses just one outphasing angle for the constant-envelope signals at one carrier frequency. As the outphasing angle varies from this particular outphasing angle depending upon the modulation scheme or the carrier frequency changes, the load modulation increases. A single Chireix capacitive and inductive loading thus cannot cover all modulation schemes and carrier frequencies. An outphasing designer thus had two choices: either be subjected to a spectral expansion or be subjected to load modulation despite the use of Chireix compensation. This dilemma is solved herein such that a spatial combination occurs in free space without any significant load modulation and without the spectral expansion of using separate antennas for the amplified constant-envelope.

To provide this advantageous spatial combining, each amplified constant-envelope signal is fed to a corresponding antenna feeder. Since there are two amplified constant-envelope signals for a given linear polarization, there are thus two corresponding antenna feeders. With nothing more, the resulting combination would be in free space and thus lead to the spectral expansion discussed earlier. However, the two antenna feeders parasitically excite a corresponding antenna such as a patch antenna. The patch antenna radiates the two constant-envelope signals without any significant load modulation due to the isolation between the two antenna feeders. Since the patch antenna radiates both the constant-envelope signals, the two constant-envelope signals may then spatially combine in free space to form a combined signal having a varying envelope without any significant spectral expansion such that spectral mask requirements are met despite the outphasing. A successful outphasing is thus provided without the complications of load modulation and without spectral expansion.

Before the outphasing antennas are discussed in more detail, some background on outphasing will first be discussed. A digital source such as a modem generates a large-PAPR signal (e.g., an OFDM signal) for transmission. This signal may be derived as the real part of a complex envelope modulated signal S(t) as given by the following Equation (1):

$$S(t)=r(t)e^{j\varphi(t)} \qquad \text{Equation (1)}$$

where r(t) is the instantaneous amplitude and φ(t) is the modulation phase. If $r_{max}$ is the maximum value of r(t), then r(t) equals $r_{max}$*cos(Θ(t)), where Θ(t) is a first outphasing angle. Since cos(Θ(t)) equals $(e^{j\Theta(t)}+e^{-j\Theta(t)})/2$, Equation (1) may thus be rewritten as the following Equation (2):

$$S(t)=r\max(e^{j\Theta(t)}+e^{-j\Theta(t)})/2)e^{j\varphi(t)} \qquad \text{Equation (2)}$$

From Equation (2), it may be seen that S(t) can be decomposed into two constant-envelope signals S1(*t*)=$r_{max}$ $((e^{j\Theta(t)})/2)\ e^{j\varphi(t)}$ and S2(*t*)=$r_{max}$ $((e^{-j\Theta(t)})/2)\ e^{j\varphi(t)}$. The digital source such as the modem may thus be configured to decompose the high-PAPR signal into the two constant-envelope signals S1(*t*) and S2(*t*). Each constant-envelope signal is then amplified by a corresponding power amplifier. There is thus a first power amplifier for amplifying S1(*t*) and a second power amplifier for amplifying S2(*t*). Since the decomposition of the high-PAPR signal into S1(*t*) and S2(*t*) and the subsequent amplification of S1(*t*) and S2(*t*) by corresponding power amplifiers is known, the following discussion will be focused on an antenna structure for the advantageous on-antenna spatial combination of S1(*t*) and S2(*t*) without significant load modulation. The signals S1(*t*) and S2(*t*) are referred to as S1 and S2, respectively, for brevity in the following discussion.

Figure 1B:
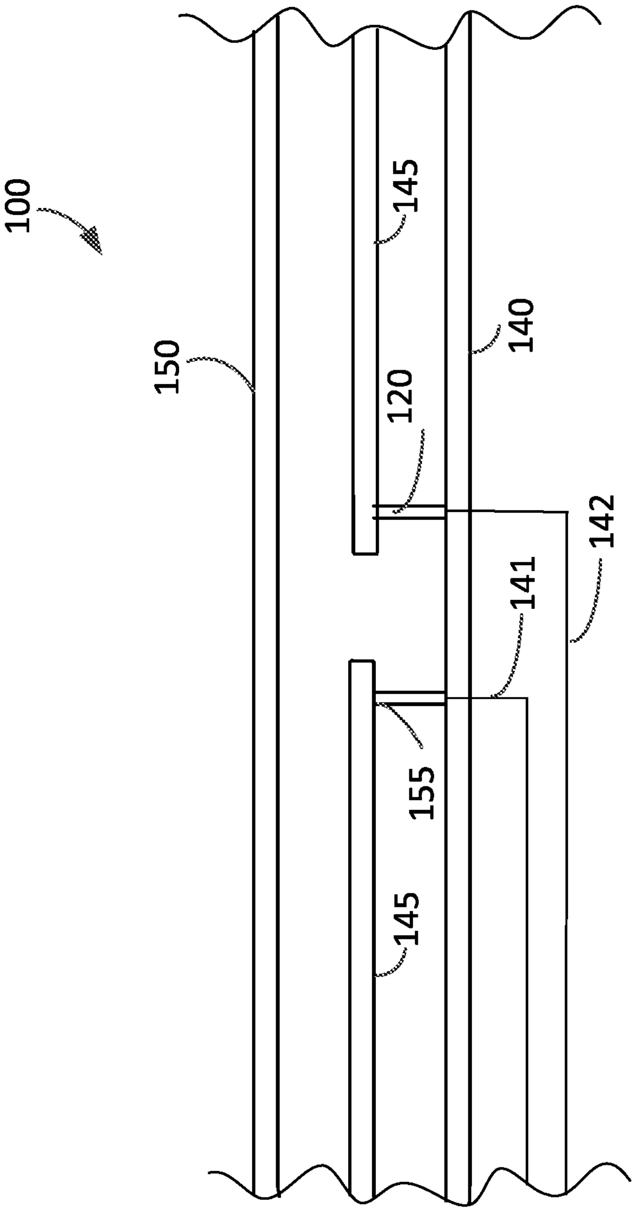
FIG. 1B is a cross-sectional partial view of the antenna structure of FIG. 1A.
Figure 1C:
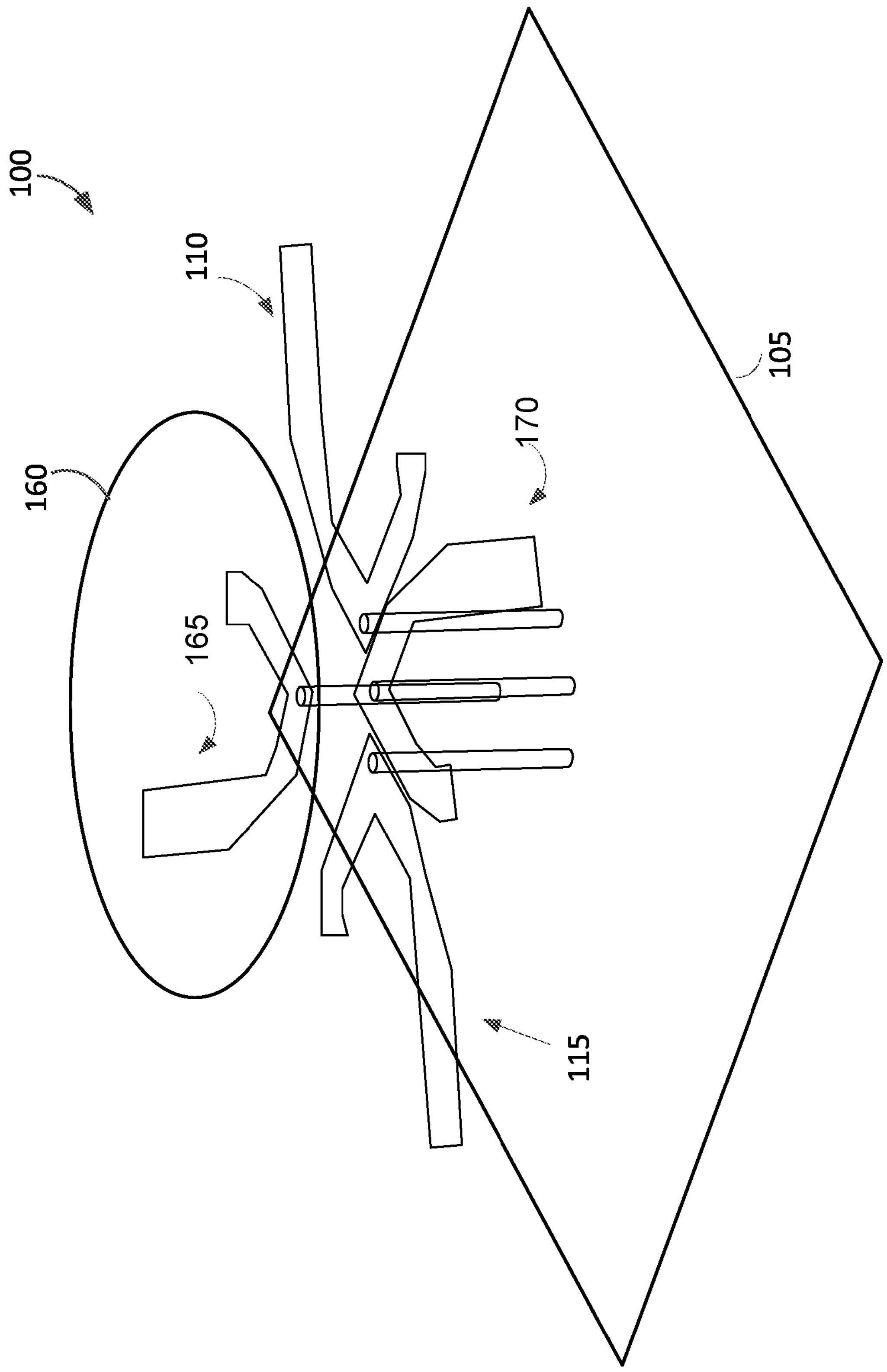
FIG. 1C is a perspective view of the antenna structure of FIG. 1A.

An example antenna structure 100 is shown in plan view in FIG. 1A, in a cross-sectional view in FIG. 1B, and in a perspective view in FIG. 1C. A first antenna feeder 110 is formed in a metal layer adjacent a metallic ground plane 105. Similarly, a second antenna feeder 115 is also formed in the same metal layer that forms first antenna feeder 110. A first power amplifier (not illustrated) amplifies S1 to drive a transmission line (discussed further below) such as a microstrip line or a stripline below metallic ground plane 105 with an amplified version of S1. The transmission line then couples through an aperture in metallic ground plane 105 to a via 120 that couples to first antenna feeder 110. Similarly, a second power amplifier (not illustrated) amplifies S2 to drive a corresponding transmission line below metallic ground plane 105 with an amplified version of S2. The transmission line then couples through an aperture in metallic ground plane 105 to a via 155 that couples to second antenna feeder 115.

First antenna 110 feeder includes a first linear element 125 that is resonant at a carrier frequency of a first frequency band. First antenna feeder 110 is J-shaped so as to have a second linear element 130 that is longer than first linear element 125. The resulting J-shape of first antenna feeder 110 is advantageous for dual-band coverage as discussed herein with respect to additional implementations. It will be appreciated, however, that first antenna feeder 110 could consist of just the first linear element 125 or the second linear element 130 since antenna structure 100 may be implemented as a single-band implementation. In such an implementation, each antenna feeder may be referred to as a linear antenna feeder. Second antenna feeder 115 is rotationally symmetric with first antenna feeder 110 and thus is J-shaped and includes an analogous first linear element 135 and the via 155. In the following discussion, it will be assumed that the first frequency band is approximately 37 to 42 GHz, but any suitable frequency band may be exploited by a suitable change in the length of linear elements 125 and 135. Both linear elements 125 and 135 have a length so as to be resonant at a first frequency in the desired frequency band.

As shown in FIG. 1B, a first metal layer 140 may be patterned to form ground plane 105. Similarly, a second metal layer 145 may be patterned form first and second antenna feeders 110 and 115. A first transmission line 142 below first metal layer 140 couples to via 120 to drive first antenna feeder 110 with an amplified version of S1. Similarly, a second transmission line 141 below first metal layer 140 couples to via 155 to drive second antenna feeder 115 with an amplified version of S2. A via 185 (described below) is omitted from FIG. 1B for illustration clarity.

The combination of first antenna feeder 110 and ground plane 105 may be considered to form an unconventional dipole antenna. Similarly, the combination of second antenna feeder 115 and ground plane 105 forms another unconventional dipole antenna. Thus, antenna feeders 110 and 115 may also be denoted as dipole antennas herein. Without more, note that the separate driving of S1 to be radiated by a first dipole antenna along with the separate driving of S2 to be radiated by another dipole antenna would result in a free-space combination. Such a free-space combination from separate antennas results in undesirable spectral expansion as discussed earlier. To solve this problem, antenna structure 100 advantageously includes a patch antenna such as a circular patch antenna 160 that is patterned from a metal layer 150. As shown in FIG. 1B, metal layer 145 for the formation of the antenna feeders lies between metal layers 140 and 150. In alternative implementations, metal layer 150 may instead be between metal layers 145 and 140. The metal layers 140, 145, and 150 are separated by corresponding dielectric layers such as corresponding circuit board substrates or semiconductor layers. These dielectric layers are collectively referred to as a substrate herein.

To broaden the frequency response over the frequency band of interest, patch antenna 160 is sized so as to be resonant at a second frequency within the frequency band of interest that is distinct from the first frequency for the resonance of the antenna feeders. However, the first and second frequencies are sufficiently close such that the patch antenna 160 parasitically couples to the antenna feeders. The result is that S1 and S2 radiate from patch antenna 160 so as to spatially combine in free space without any significant spectral expansion. In alternative implementations, the first and second frequencies may be the same. Regardless of whether the frequency response is broadened or not, the antenna feeders are sufficiently isolated from each other such that the resulting load modulation is negligible as compared to a positive addition in a separate power combiner or a differential addition at a single antenna. The dilemma of choosing between frequency expansion or efficiency losses from load modulation is thus solved by antenna structure 100.

Referring again to FIG. 1A, note that linear elements 125 and 135 are antipodally arranged from each other with respect to a first diameter of patch antenna 160. This substantially radial alignment of each linear element with respect to the center of patch antenna 160 results in a first linear polarization for the on-antenna combination of the S1 and S2 signals. To provide a dual-polarization capability, antenna structure 100 may also include a third antenna feeder 165 and a fourth antenna feeder 170. Third antenna feeder 165 has a first linear element 175 whereas fourth antenna feeder 170 include a first linear element 180. The dimensions of these linear elements are configured to be resonant at the first frequency as discussed with respect to linear elements 125 and 135. Feeders 165 and 170 are J-shaped such that they each include a longer linear element for dual-band coverage as will be explained further with regard to additional implementations. It will be appreciated that antenna feeders 165 and 170 could thus just comprise linear elements 175 and 180 (or just the longer linear elements of feeders 165, 170) in alternative implementations since antenna structure 100 may be implemented as a single-band structure. Linear elements 175 and 180 are positioned to be substantially radially aligned with respect to a center of patch antenna 160. However, this radial alignment is rotated 90 degrees with respect to the radial alignment of linear elements 125 and 135. In this fashion, should S1 drive third antenna feeder 165 and S2 drive fourth antenna feeder 170 through respective vias, the resulting on-antenna combination on patch antenna 160 will produce a second linear polarization in the radiated signal that is orthogonal to the first linear polarization resulting from the driving of first antenna feeder 110 and second antenna feeder 115. Antenna structure 100 may thus be used for four different polarizations: a first linear polarization from driving just antenna feeders 110 and 115, a second linear polarization from driving just antenna feeders 165 and 170, a first circular polarization from the driving of all the antenna feeders but with opposite phases between feeders 110/115 and feeders 165/175, and a second circular polarization from the driving of all the antenna feeders (with an appropriate phasing as compared to the first circular polarization).

To provide additional strength to antenna structure 100 and isolation from load modulation, a constellation of vias 185 as shown in FIG. 1A may be located centrally between the antenna feeders. Vias 185 couple from ground plane 105 to extend to the height of the antenna feeders. In addition, a distal end of each antenna feeder may be grounded through one or more vias 190. Fewer (or no) vias may be implemented than are illustrated in FIG. 1A. For example, only a single center via 185 may be implemented in some configurations. Similarly, a greater number of vias may be implemented in other examples.

Figure 2A:
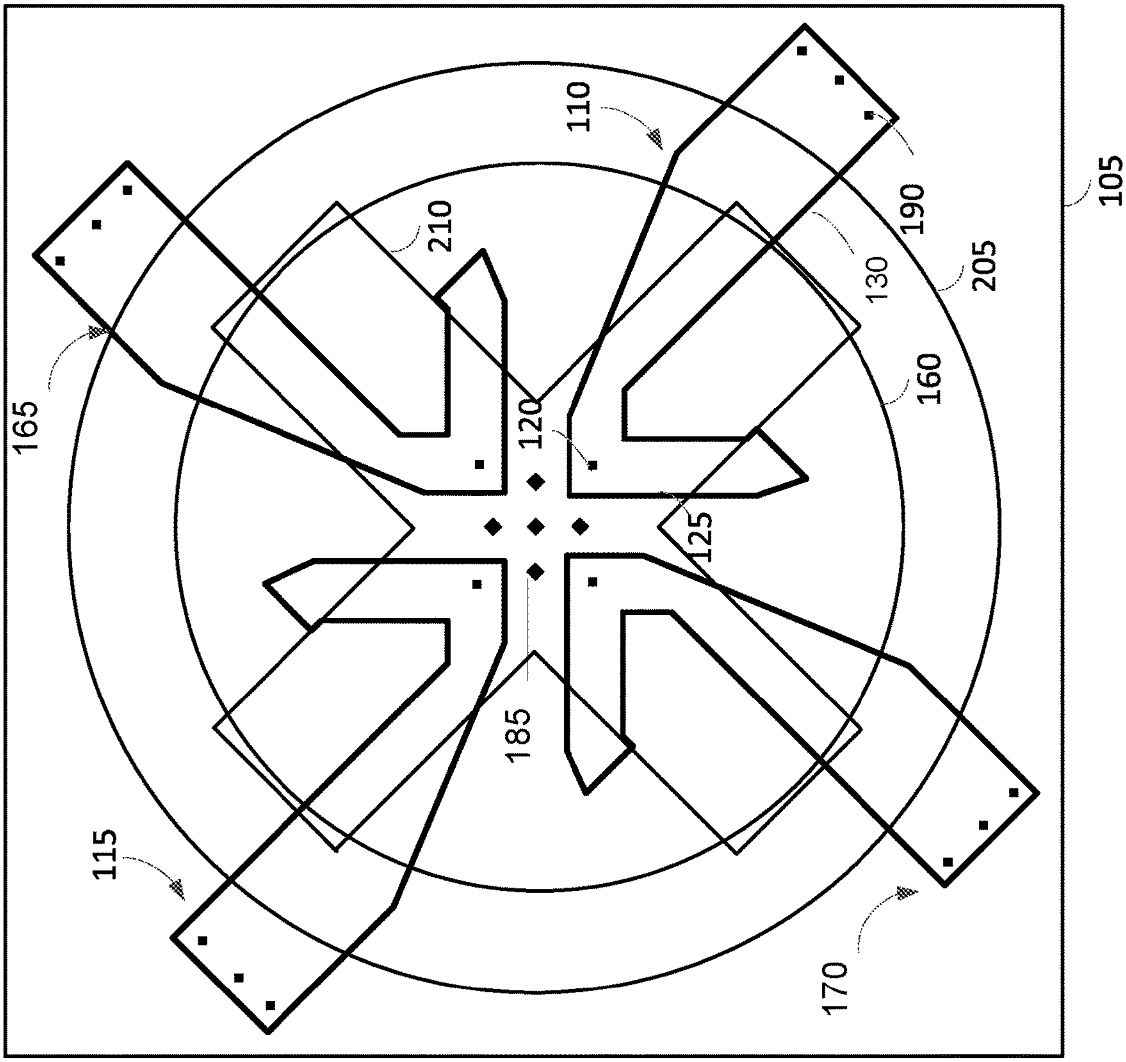
FIG. 2A is a plan view of a dual-polarized dual-band antenna structure for outphasing in accordance with an aspect of the disclosure.
Figure 2B:
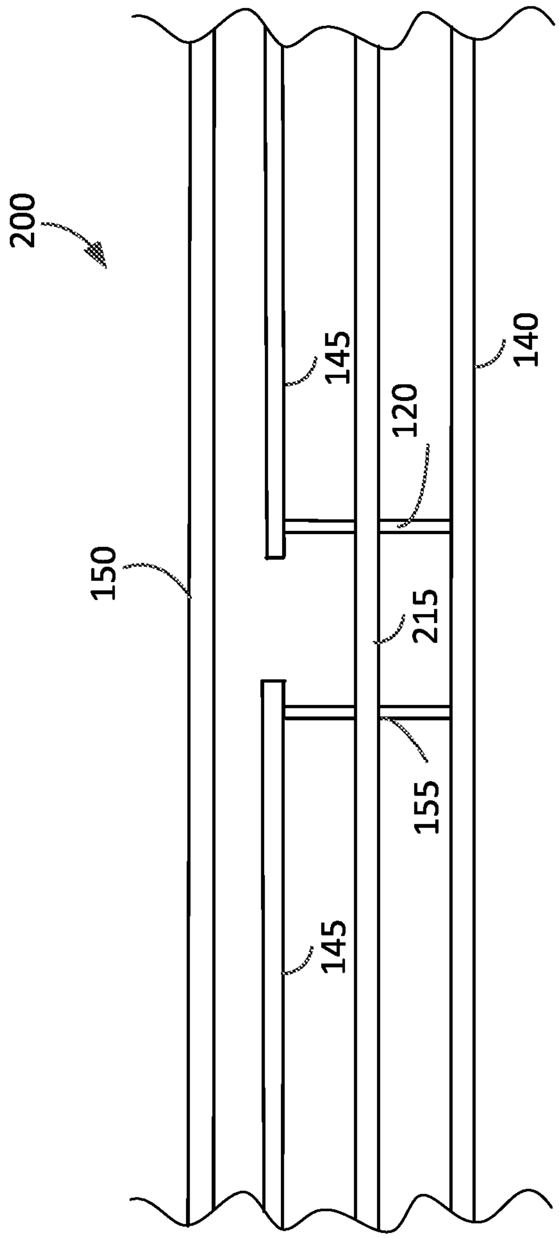
FIG. 2B is a cross-sectional partial view of the antenna structure of FIG. 2A.

As discussed above, the use of J-shaped antenna feeders is advantageous with respect to providing dual-band coverage. An example dual-band dual-polarized antenna structure 200 is shown in plan view in FIG. 2A. Ground plane 105, antenna feeders 110, 115, 165, and 170, and patch antenna 160 are arranged as discussed for antenna structure 100. But in antenna structure 200, a patch antenna such as a circular patch antenna 205 intervenes between ground plane 105 and antenna feeders 110, 115, 165, and 170. Patch antenna 205 is patterned from a metal layer 215 as shown in the cross-sectional view of FIG. 2B. Metal layer 215 is positioned between the metal layer 140 for ground plane 105 and the metal layer 145 for the antenna feeders 110, 115, 165, and 170. Each antenna feeder is a J-shaped antenna feeder (and thus also a J-shaped unconventional dipole antenna) as discussed with regard to antenna structure 100. Each antenna feeder thus includes a first linear element that is connected to a longer second linear element through an apex of each J-shape. The second linear element is longer than the first linear element and is thus resonant at a lower frequency. For example, first antenna feeder 110 includes the first linear element 125 and second linear element 130 as discussed with regard to antenna structure 100. The corresponding first and second linear elements of the remaining antenna feeders 115, 165, and 170 are not labeled in FIG. 2A for illustration clarity but are arranged analogously. In one implementation, each second linear element may have a length so as to be resonant at a first frequency in a first frequency band. In one implementation, the first frequency band may extend from approximately 24.5 GHz to 29.5 GHz. Patch antenna 205 is sized so as to be resonant at a second frequency in the first frequency band for broadening the frequency response with the first frequency band. The first frequency band may also be denoted as a low band herein such that patch antenna 205 may also be denoted as a low-band patch antenna 205. The first and second frequencies may not be equal but are sufficiently close such that the second linear elements of the antenna feeders may parasitically excite patch antenna 205. In this fashion, the frequency response in the low band is extended as compared to implementations in which the resonant frequencies of patch antenna 205 and the second linear elements were equal.

First antenna feeder 110 is driven by via 120 as discussed for antenna structure 100. But this driving is now a high-band excitation (for example, exciting the linear element 125 and the corresponding shorter linear elements in the other feeders) during a high-band mode and a low-band excitation (for example, exciting the linear element 130 and the corresponding longer linear elements in the other feeders) during a low-band mode. In this fashion, a transmitter may generate S1 for a high-band excitation and drive via 120 accordingly. Conversely, the transmitter may drive via 120 for a low-band excitation with a corresponding S1 signal. The first (shorter) linear elements and patch 160 are sized for different resonant frequencies within the high band analogously as discussed for antenna structure 100. In one implementation, the high band may extend from approximately 37.5 GHz to 43.5 GHz although it will be appreciated that antenna structure 200 may be adapted for a wide range of frequencies with respect to particular values for the first band and the second band. The central constellation of vias 185 and ground vias 190 are arranged as discussed for antenna structure 100.

The apex of the remaining antenna feeders 115, 165, and 170 couples to an analogous via that may be excited in both the high-band mode and also in the low-band mode. In this fashion, antenna structure 200 may propagate according to any of the two orthogonal polarizations discussed with regard to antenna structure 100 but also within either the high band or the low band. Although the low band combination at patch 205 is isolated from the corresponding excitation from the corresponding antenna feeders, patch 205 may also include an X-shaped opening 210. The arms of X-shaped opening 210 share substantially the same radial alignment with respect to a center of patch 205 as is implemented for the second (longer) linear elements of each feeder. In this fashion, surface waves on patch 205 that could otherwise cause coupling between the power amplifiers for S1 and S2 in the low band are suppressed.

Figure 3:
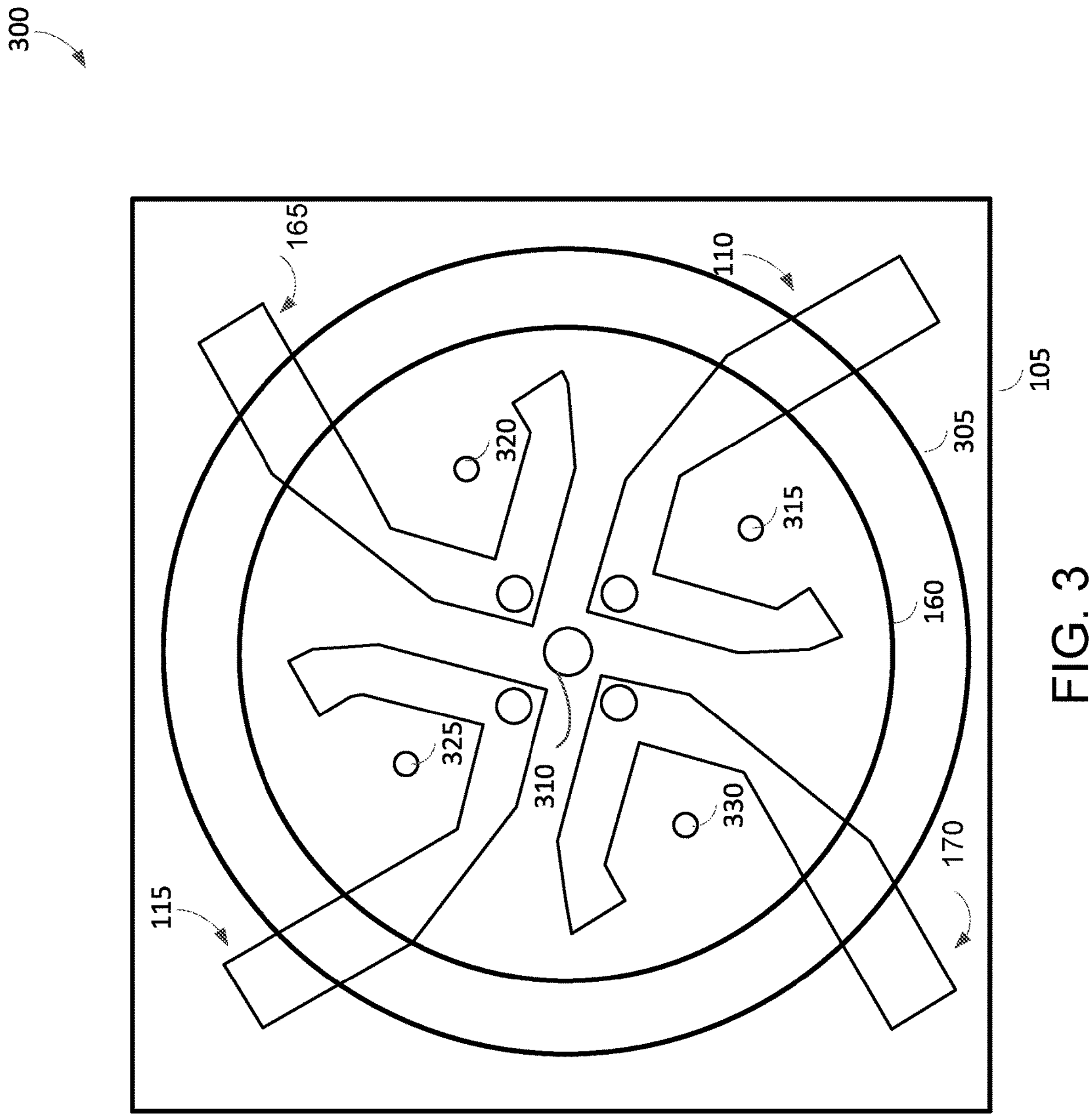
FIG. 3 is a plan view of a dual-polarized dual-band antenna structure for outphasing in accordance with an aspect of the disclosure.

In yet another dual-polarized dual-band antenna structure implementation, the X-shaped aperture on the low-band patch may be replaced by a central ground via. In such an implementation, the low-band patch may be directly excited by the low-band versions of S1 and S2 through corresponding vias as compared to being parasitically excited by the antenna feeders. But in such an implementation, the low-band patch will parasitically excite the second linear portions of each J-shaped antenna feed such that the on-antenna combination without significant load modulation is achieved. An example of such an antenna structure 300 is shown in FIG. 3. High-band patch antenna 160 is parasitically excited by antenna feeders 110, 115, 165, and 170 as discussed with regard to antenna structure 200. But a low-band patch 305 is instead excited by vias 315, 320, 325, and 330 that couple to corresponding transmission lines (not illustrated) below ground plane 105. These vias correspond to the antenna feeder pairs. For example, vias 315 and 325 would be selected during a low-band excitation to be driven by the low-band versions of S1 and S2, respectively, to produce a low-band combined signal with the first linear polarization. Conversely, vias to the apexes of antenna feeders 110 and 115 would be selected during a high-band excitation with the same first linear polarization. Similarly, vias 320 and 330 would be selected during a low-band excitation to be driven by the low-band versions of S1 and S2, respectively, to produce a low-band combined signal with the second linear polarization. Conversely, vias to the apexes of antenna feeders 165 and 170 would be selected during a high-band excitation with the same second linear polarization. Although the vias 320, 315, 325, and 330 tend to produce a differential excitation of low-band patch 305, there is no significant spectral expansion nor is there any significant load modulation due to the isolation between the corresponding power amplifiers for S1 and S2 provided by the central ground 310 of low-band patch 305 and the parasitic coupling to the isolated second linear elements of the antenna feeders. Note that antenna structure 300 is advantageous even if outphasing is not used as it may be used as a single aperture dual band, dual fed, dual polarized antenna structure or element when operated without outphasing. In such an implementation, a single transmit chain and thus a common power amplifier may drive the vias. For example, vias 315 and 325 may be selected during a low-band excitation without outphasing to be driven (differentially, in some examples) by a single low-band signal, respectively, to radiate a low-band signal with the first linear polarization. Conversely, vias to the apexes of antenna feeders 110 and 115 would be selected during a high-band excitation without outphasing with the same first linear polarization and driven (differentially, in some examples) with a single high-band signal to radiate a high-band signal with the first linear polarization. Similarly, the structure illustrated in FIG. 2 may be used as a single aperture dual band, dual fed, dual polarized antenna structure or element when operated without outphasing, and the structure illustrated in FIG. 1 may be used as a dual fed, dual polarized antenna structure or element when operated without outphasing. The antenna structures illustrated herein may be used in yet other implementations, not explicitly discussed herein, as well.

Figure 4:
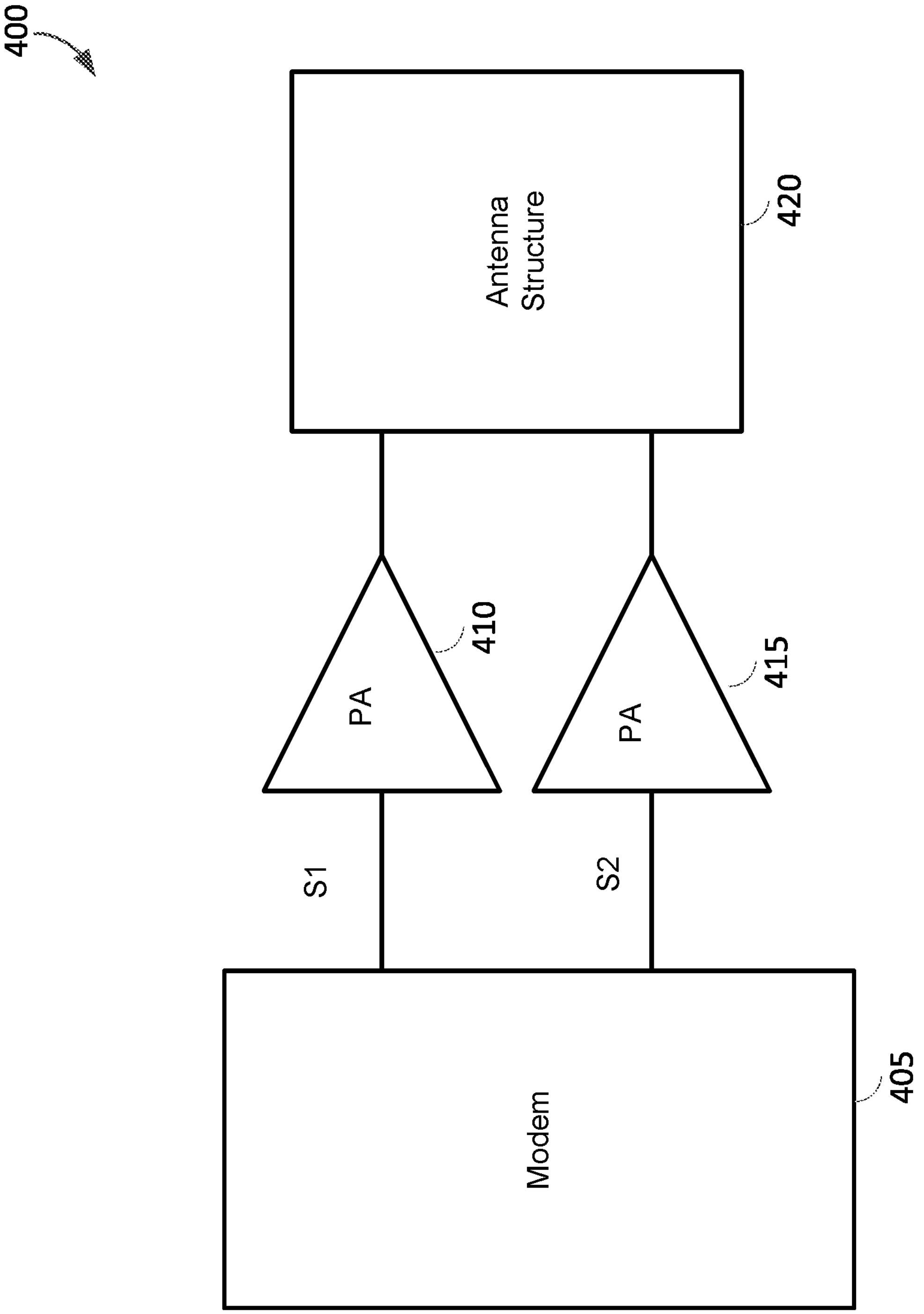
FIG. 4 is a diagram of a transmitter including an outphasing antenna structure in accordance with an aspect of the disclosure.

An example transmitter 400 such as a base station or a user equipment that includes an antenna structure 420 with the on-antenna combination as discussed herein is shown in FIG. 4. A modem 405 decomposes a high-PAPR signal into the S1 and S2 signals. This decomposition is being shown for a particular band such as either the high band or the low band as discussed with regard to antenna structures 200 and 300. A first power amplifier (PA) 410 amplifies S1 to drive antenna structure 420 with an amplified version of S1. Similarly, a second power amplifier 415 amplifies S2 to drive antenna structure 420 with an amplified version of S2. Note that the selection of the corresponding vias in antenna structure 420 is not illustrated. For example, suppose a low-band combined signal is to be produced according to the first linear polarization. Transmitter 400 could then select for vias (not illustrated) in antenna structure 420 that are analogous to via 220 in first antenna feeder 110 of antenna structure 200. In other examples, selection is not required, but separate chains for each feeder in each polarization are included. In dual-band implementations operated without outphasing, one of the S1 or S2 chains may be omitted, or the illustrated chains may be used for signals of opposite phase instead of for S1 and S2.

Figure 5:
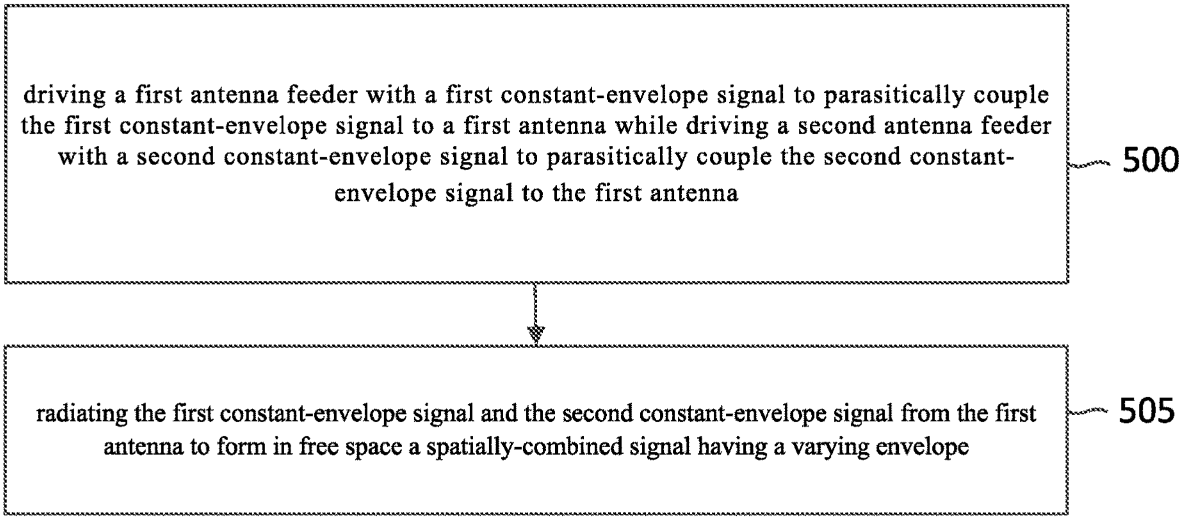
FIG. 5 is a flowchart for an example outphasing method in accordance with an aspect of the disclosure.

An example outphasing method will now be discussed with reference to the flowchart of FIG. 5. The method includes an act 500 of driving a first antenna feeder with a first constant-envelope signal to parasitically couple the first constant-envelope signal to a first antenna while driving a second antenna feeder with a second constant-envelope signal to parasitically couple the second constant-envelope signal to the first antenna. An antipodally-arranged pair of antenna feeders such as first antenna feeder 110 and second antenna feeder 115 or such as third antenna feeder 165 and fourth antenna feeder 170 are examples of the first and second antenna feeders of act 500. Any of patch antennas 160 and 205 is an example of the first antenna of act 500. In addition, the method includes an act 505 of radiating the first constant-envelope signal and the second constant-envelope signal from the first antenna to form in free space a spatially-combined signal having a varying envelope. The radiation of signals S1 and S2 from patch antennas 160 or 205 so as to spatially combine in free space is an example of act 505.

The disclosure will now be summarized in the following example clauses.

Clause 1. An outphasing antenna structure, comprising:

a substrate including a first metal layer, a second metal layer, and a third metal layer;

a ground plane formed in the first metal layer;

a first linear antenna feeder formed in the second metal layer, the first linear antenna feeder having a length so as to be resonant at a first frequency within a first frequency band, the first linear antenna feeder being coupled to a first via that extends through the ground plane to a first transmission line configured to drive the first via and the first linear antenna feeder with a first outphasing signal;

a second linear antenna feeder formed in the second metal layer, the second linear antenna feeder having a length so as to be resonant at the first frequency within the first frequency band, the second linear antenna feeder being coupled to a second via that extends through the ground plane to a second transmission line configured to drive the second via and the second linear antenna feeder with a second outphasing signal; and a first patch antenna formed in the third metal layer, the first patch antenna having a width so as to be resonant at a second frequency within the first frequency band.

Clause 2. The outphasing antenna structure of clause 1, wherein the first patch antenna is circular, the first linear antenna feeder is arranged to be substantially radially aligned with a center of the first patch antenna to excite a first linear polarization and the second linear antenna feeder is substantially radially aligned with the center of the first patch antenna to excite the first linear polarization.

Clause 3. The outphasing antenna structure of clause 2, further comprising:

a third linear antenna feeder formed in the second metal layer, the third linear antenna feeder having a length so as to be resonant at the first frequency within the first frequency band, the first linear antenna feeder being coupled to a third via that extends through the ground plane to a third transmission line configured to drive the third via and the third linear antenna feeder with the first outphasing signal; and a fourth linear antenna feeder formed in the second metal layer, the fourth linear antenna feeder having a length so as to be resonant at the first frequency within the first frequency band, the fourth linear antenna feeder being coupled to a fourth via that extends through the ground plane to a fourth transmission line configured to drive the fourth via and the fourth linear antenna feeder with the second outphasing signal.

Clause 4. The outphasing antenna structure of clause 3, wherein the first linear antenna feeder and the second linear antenna feeder are antipodally arranged along a first diameter of the first patch antenna, the third linear antenna feeder and the fourth linear antenna feeder are antipodally arranged along a second diameter of the first patch antenna, and wherein the second diameter is orthogonal to the first diameter.

Clause 5. The outphasing antenna structure of clause 4, wherein the first linear antenna feeder is included in a first J-shaped antenna feeder, the second linear antenna feeder is included in a second J-shaped antenna feeder, the third linear antenna feeder is included in a third J-shaped antenna feeder, and the fourth linear antenna feeder is included in a fourth J-shaped antenna feeder.

Clause 6. The outphasing antenna structure of clause 5, wherein each J-shaped antenna feeder is configured to be resonant at a first frequency in a second frequency band, and wherein the second frequency band is a lower-frequency band than the first frequency band.

Clause 7. The outphasing antenna structure of any of claims 1-5, wherein the substrate includes a fourth metal layer, the outphasing antenna structure further comprising:

a second patch antenna formed in the fourth metal layer.

Clause 8. The outphasing antenna structure of clause 7, wherein the second patch antenna is a circular patch antenna that is larger than the first patch antenna.

Clause 9. The outphasing antenna structure of any of clauses 7-8, wherein the second patch antenna includes an X-shaped opening.

Clause 10. The outphasing antenna structure of any of clauses 1-9, wherein the outphasing antenna structure is included in a transmitter including a first power amplifier configured to amplify the first outphasing signal and including a second power amplifier configured to amplify the second outphasing signal.

Clause 11. The outphasing antenna structure of clause 10, wherein the transmitter is included in a base station.

Clause 12. The outphasing antenna structure of clause 10, wherein the transmitter is included in a user equipment.

Clause 13. An outphasing method, comprising:

driving a first antenna feeder with a first constant-envelope signal to parasitically couple the first constant-envelope signal to a first antenna while driving a second antenna feeder with a second constant-envelope signal to parasitically couple the second constant-envelope signal to the first antenna; and radiating the first constant-envelope signal and the second constant-envelope signal from the first antenna to form in free space a spatially-combined signal having a varying envelope.

Clause 14. The outphasing method of clause 13, further comprising:

decomposing a transmitter signal to form the first constant-envelope signal and the second constant-envelope signal.

Clause 15. The outphasing method of clause 14, wherein the transmitter signal is an orthogonal frequency division multiplexing signal.

Clause 16. The outphasing method of any of clauses 13-15, wherein driving the first antenna feeder comprises driving a first J-shaped antenna feeder and wherein driving the second antenna feeder comprises driving a second J-shaped antenna feeder.

Clause 17. The outphasing method of any of clauses 13-16, wherein radiating from the first antenna comprises radiating from a patch antenna.

Clause 18. The outphasing method of clause 17, wherein radiating from the patch antenna comprises radiating from a circular patch antenna.

Clause 19. An antenna structure, comprising:

four J-shaped antenna feeders;

a first patch antenna configured to parasitically couple to the four J-shaped antenna feeders over a first frequency band; and a second patch antenna configured to parasitically couple to the four J-shaped antenna feeders over a second frequency band that is a higher frequency band than the first frequency band.

Clause 20. The antenna structure of clause 19, wherein a first pair of J-shaped antenna feeders from the four J-shaped antenna feeders is aligned to excite a first linear polarization.

Clause 21. The antenna structure of clause 20, wherein a second pair of J-shaped antenna feeders from the four J-shaped antenna feeders is aligned to excite a second linear polarization that is orthogonal to the first linear polarization.

Clause 22. The antenna structure of any of clause 19-21, further comprising a metallic ground plane.

Clause 23. The antenna structure of any of clauses 19-22, wherein the first patch antenna and the second patch antenna are circular patch antennas.

Clause 24. The antenna structure of any of clause 19-23, wherein the first patch antenna and the second patch antenna are disposed on opposite sides of the four J-shaped antenna feeders.

In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An outphasing antenna structure, comprising:

a substrate including a first metal layer, a second metal layer, and a third metal layer;

a ground plane formed in the first metal layer;

a first linear antenna feeder formed in the second metal layer, the first linear antenna feeder having a length so as to be resonant at a first frequency within a first frequency band, the first linear antenna feeder being coupled to a first via that extends through the ground plane to a first transmission line configured to drive the first via and the first linear antenna feeder with a first outphasing signal;

a second linear antenna feeder formed in the second metal layer, the second linear antenna feeder having a length so as to be resonant at the first frequency within the first frequency band, the second linear antenna feeder being coupled to a second via that extends through the ground plane to a second transmission line configured to drive the second via and the second linear antenna feeder with a second outphasing signal; and a first patch antenna formed in the third metal layer, the first patch antenna having a width so as to be resonant at a second frequency within the first frequency band.

2. The outphasing antenna structure of claim 1, wherein the first patch antenna is circular, the first linear antenna feeder is arranged to be substantially radially aligned with a center of the first patch antenna to excite a first linear polarization and the second linear antenna feeder is substantially radially aligned with the center of the first patch antenna to excite the first linear polarization.

3. The outphasing antenna structure of claim 2, further comprising:

a third linear antenna feeder formed in the second metal layer, the third linear antenna feeder having a length so as to be resonant at the first frequency within the first frequency band, the third linear antenna feeder being coupled to a third via that extends through the ground plane to a third transmission line configured to drive the third via and the third linear antenna feeder with the first outphasing signal; and a fourth linear antenna feeder formed in the second metal layer, the fourth linear antenna feeder having a length so as to be resonant at the first frequency within the first frequency band, the fourth linear antenna feeder being coupled to a fourth via that extends through the ground plane to a fourth transmission line configured to drive the fourth via and the fourth linear antenna feeder with the second outphasing signal.

4. The outphasing antenna structure of claim 3, wherein the first linear antenna feeder and the second linear antenna feeder are antipodally arranged along a first diameter of the first patch antenna, the third linear antenna feeder and the fourth linear antenna feeder are antipodally arranged along a second diameter of the first patch antenna, and wherein the second diameter is orthogonal to the first diameter.

5. The outphasing antenna structure of claim 4, wherein the first linear antenna feeder is included in a first J-shaped antenna feeder, the second linear antenna feeder is included in a second J-shaped antenna feeder, the third linear antenna feeder is included in a third J-shaped antenna feeder, and the fourth linear antenna feeder is included in a fourth J-shaped antenna feeder.

6. The outphasing antenna structure of claim 5, wherein each J-shaped antenna feeder is configured to be resonant at a first frequency in a second frequency band, and wherein the second frequency band is a lower-frequency band than the first frequency band.

7. The outphasing antenna structure of claim 6, wherein the substrate includes a fourth metal layer, the outphasing antenna structure further comprising:

a second patch antenna formed in the fourth metal layer.

8. The outphasing antenna structure of claim 7, wherein the second patch antenna is a circular patch antenna that is larger than the first patch antenna.

9. The outphasing antenna structure of claim 8, wherein the second patch antenna includes an X-shaped opening.

10. The outphasing antenna structure of claim 1, wherein the outphasing antenna structure is included in a transmitter including a first power amplifier configured to amplify the first outphasing signal and including a second power amplifier configured to amplify the second outphasing signal.

11. The outphasing antenna structure of claim 10, wherein the transmitter is included in a base station.

12. The outphasing antenna structure of claim 10, wherein the transmitter is included in a user equipment.

13. An antenna structure, comprising:

four J-shaped antenna feeders;

a first patch antenna configured to parasitically couple to the four J-shaped antenna feeders over a first frequency band; and a second patch antenna configured to parasitically couple to the four J-shaped antenna feeders over a second frequency band that is a higher frequency band than the first frequency band.

14. The antenna structure of claim 13, wherein a first pair of J-shaped antenna feeders from the four J-shaped antenna feeders is aligned to excite a first linear polarization.

15. The antenna structure of claim 14, wherein a second pair of J-shaped antenna feeders from the four J-shaped antenna feeders is aligned to excite a second linear polarization that is orthogonal to the first linear polarization.

16. The antenna structure of claim 13, further comprising a metallic ground plane.

17. The antenna structure of claim 13, wherein the first patch antenna and the second patch antenna are circular patch antennas.

18. The antenna structure of claim 17, wherein the first patch antenna and the second patch antenna are disposed on opposite sides of the four J-shaped antenna feeders.

* * * * *